(12) United States Patent
Pamfiloff

(10) Patent No.: US 8,710,457 B1
(45) Date of Patent: *Apr. 29, 2014

(54) PROCESS FOR THE PRODUCTION OF ELECTRIC ENERGY BY THE EXCITATION AND CAPTURE OF ELECTRONS FROM GROUND OR WATER SOURCES

(71) Applicant: Eugene B. Pamfiloff, San Anselmo, CA (US)

(72) Inventor: Eugene B. Pamfiloff, San Anselmo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/987,195

(22) Filed: Jul. 10, 2013

(51) Int. Cl.
*G21K 5/00* (2006.01)

(52) U.S. Cl.
USPC ............... 250/423 F; 250/423 R; 250/424

(58) Field of Classification Search
USPC ............ 250/423 R, 424, 425, 427, 423 F; 315/111.01, 111.81, 111.91
See application file for complete search history.

(56) References Cited

U.S. PATENT DOCUMENTS

| | | | |
|---|---|---|---|
| 8,294,120 B1 * | 10/2012 | Pamfiloff | 250/424 |
| 8,481,965 B1 * | 7/2013 | Pamfiloff | 250/423 F |
| 2002/0067131 A1 * | 6/2002 | Nelson | 315/1 |
| 2005/0098720 A1 * | 5/2005 | Traynor et al. | 250/288 |

* cited by examiner

*Primary Examiner* — Nicole Ippolito

(57) ABSTRACT

The process of the present application facilitates the production of electric energy by the excitation and capture of electrons from atoms, molecules and ions from ground or water sources, or any other form of matter that can be passed along the surface or through the electron extraction assembly. The electrons are captured, collected, isolated and controlled for distribution as electric energy. It is an energy efficient process for the capture of electrons and for the production of electric energy. These results are accomplished by the excitation and capture of electrons from the object particles by electrically charged components in an electric field. It can operate continuously without interruption. Through the subject process, electric energy can be supplied individually to each structure, community or demand location allowing independence from any other energy source. It can be scaled to accommodate the electric energy requirements of many implementations and utilizations that extend from the national power grid to portable units and units fitted to stationary or portable appliances, devices, apparatus and vehicles.

1 Claim, 4 Drawing Sheets

PROCESS FOR THE PRODUCTION OF ELECTRIC ENERGY BY THE EXCITATION AND CAPTURE OF ELECTRONS FROM GROUND OR WATER SOURCES

CROSS-REFERENCE TO RELATED APPLICATION

Not Applicable

FEDERALLY SPONSORED RESEARCH

Not Applicable

SEQUENCE LISTING

Not Applicable

BACKGROUND

This application relates to the field of atomic physics and atomic engineering, particularly to the manipulation and control of electrons for the production of electric energy through an efficient and effective process for the excitation and capture of electrons from atoms and molecules situated above, at, or below the surface of ground or water sources.

PRIOR ART

Currently a number of methods are available to produce electric energy; among these are electric generators, alternators, photovoltaic cells, chemical batteries, fuel cells, piezoelectric apparatus, thermoelectric converters and electrostatic devices. All of these involve the conversion of one form of energy into another. Here generators, alternators and piezoelectric devices convert mechanical energy, where specifically, kinetic energy or mechanical strain is thus converted into electrical. The first two require turbines or motors to rotate or move armatures within magnetic fields, while the third takes advantage of the structural strain within certain crystals. Other systems involve the conversion of chemical energy into electrical as within batteries. Among the electrostatic devices is another mechanical conversion generator called the Van de Graff.

In locations where hydroelectric generation is impractical, electricity is primarily generated by electromechanical means driven by heat engines used to power steam turbine generator apparatus, with the output usually contributing electricity to the local or national power grid. The burning of fossil fuels such as coal, oil, oil products and natural gas feeds these engines and accounts for 83% of the electricity produced in the U.S. Nuclear fission reactors are also used to provide steam to drive power plant turbines. However, the coal, oil, natural gas and nuclear fuels are not renewable and in the coming decades the available supplies will dwindle drastically. Consequently, over the past four decades much effort has been devoted to the development of alternative systems that would make use of renewable energy sources. These would include wind and geothermal generation, river and tidal current generation, and solar energy production. There are two major systems that take advantage of solar energy. One consists of the costly photovoltaic cells, which produce electricity directly in small quantity, and the other utilize mirrors to concentrate solar heat energy onto high-pressure steam boilers that in turn power the turbines. A satisfactory output for both systems is restricted to the daylight hours while the sun shines precisely upon the solar components. In regard to photovoltaic systems, if any portion of the panel becomes shaded, the electrical output drops to 10% or less of that previously produced during full exposure.

Although significant advances have occurred in many of these alternative and conventional systems, each of the current methods described has a number of disadvantages.

Additional Disadvantages of Prior Art:

1. Hundreds of thousands of kilometers of transmission lines are required to connect each building or user to the nationwide power grid.
2. During transmission, there is a substantial loss of electric energy directly from the transmission lines to the atmosphere.
3. Transmission of electricity over great distances requires elaborate substations at specific intervals to maintain the required energy level within the above grade or below grade lines.
4. With conventional equipment there is excessive wear of moving parts within the governor, gearbox, motor or turbine, and generator or alternator.
5. There is excessive wear of moving parts within wind generators that include propeller blade pitch control, speed control governor, gearbox, and generator.
6. The friction developed by the moving parts of the primary generating systems is another negative result with high levels of energy converted into heat rather than electricity.
7. Corrosion of parts and mechanisms of systems powered by hydroelectric means, and those powered by river or tidal currents.
8. All the systems discussed require many years or even decades to recover the initial investments.
9. If nuclear, the expensive materials must be constantly protected and when exhausted as fuel, the radioactive waste must be stored, guarded and monitored indefinitely.
10. Coal-fired power plants produce 40% of atmospheric carbon dioxide as well as other pollutants.
11. Because the commercial solar powered systems require motorized tracking mechanisms for the mirror or the photovoltaic panels, there is a sizeable reduction in the net electric energy produced.
12. For commercial installations to be effective with either solar powered system, the unsightly panel arrays typically occupy vast areas of land.

These are just some of the disadvantages of the current systems. The process of the present application, however, overcomes these obstacles.

ADVANTAGES AND SUMMARY

The present application describes an advantageous electrical system that provides electric power generation without the expenditure of fossil or nuclear fuels. It functions without the emission of hazardous materials or substances that could damage the environment. Furthermore, it does not contain parts that would experience undue wear or parts that would deteriorate over short periods of use. It efficiently and economically produces electric energy, continuously, twenty-four hours per day, regardless of the weather, and where there was any production in excess of immediate needs, it could be diverted to the national power grid or stored for future use. And since the power generation is fueled by something other than those diminishing fuels, these features make it the most practical and environmentally friendly of systems. The technology derived from the present application makes practical such independent power generation systems for use in large and small scale applications.

The process can be scaled to accommodate the energy requirements of most implementations, whether individual homes, multiunit complexes, multistory buildings, factory facilities, neighborhoods and regional and national power grids and more. Since each neighborhood or community can be individually powered, thousands of kilometers of transmission lines and hundreds of costly substations can be eliminated. For the production of electric energy on a large scale, the present application represents the first pragmatic technology to emerge that takes advantage of the planet's ground and liquid attributes.

Electrons captured from atoms and molecules of the immediate particulate environment of ground or water sources fuel the process. And once the system is fully energized, it requires only an infrequent enhancement to sustain operation. The process is further explained below.

Given that the subject process involves the production of ions, a discussion of the prior art related to this subject is presented. Currently, a small number of methods are available to convert electrically neutral atoms or molecules into ions. Neutral atoms contain equal numbers of electrons to the number of protons in the nucleus, while neutral molecules contain electrons in equal numbers to the sum of protons in the discrete nuclei. To ionize a neutral atom or molecule, it is necessary to either add one or more electrons to form a negative ion or knock out one or more electrons to form a positive ion. Ions, for a variety of purposes, have been deliberately produced now for nearly a century. There are several common methods to form negative and positive ions. There are very high-energy requirements by the current systems that include the continuous application of extreme temperatures during thermal ionization or extremely high voltages continuously applied during coronal discharge or other methods of high-voltage ionization. Additional restrictions are imposed by the extremes in the ionization potential or energy requirements to remove the valance or outer electrons of various atoms and molecules. The ionization potential is equal to the binding energy of the electron and is measured in electron volts (eV) or kilojoules per mole. The process of the present application also overcomes the difficulties associated with thermal, high-voltage or coronal ionization.

Exposing the target atoms or molecules to either electrical discharge from a cathode in the form of a disk or pointed emitter, or coronal discharge of electrons in a high voltage system usually produces both negative and positive ions. This occurs even when one type of ion may be preferred over the other. Similarly, a variety of electrostatic precipitators are used to place a negative electric charge on larger airborne particles such as dust or pollen. These systems also carry a number of disadvantages that include the consumption of high energy continuously over the course of operation. Another is the occasional production of unwanted ions, those that carry a charge opposite from what a system requires. On occasion, with coronal discharge, for example when negative ions are the objective, instead of being absorbed, an emitted electron will act as a projectile and knockoff or repel an electron from a passing target particle to form the unwelcome positive ion. Through each of the electrostatic methods electrons are emitted to where the successful production of negative ions depends upon the intermittent capture and retention of an electron by a passing atom or molecule. Because the atom or molecule passing the emitter is electrically neutral, it does not attract nor necessarily retain the emitted electron. Thus, it is clearly a hit-or-miss situation, resulting with a high percentage of target particles remaining unmodified, and simultaneously being encumbered by the production of accidental positive ions. Consequently, the required negative ions are contaminated by the presence of neutral particles and positive ions. This becomes counterproductive to such systems, thus requiring expensive remedies. The process of the present application overcomes these negative ramifications.

As previously indicated, the electric generating capabilities of the process of the present application can be used as independent power generation units for individual buildings, small groups of structures, complexes or neighborhoods and they can be used to supply vast regions by connecting power units to the national power grid.

DESCRIPTION OF THE PROCESS

The process of the present application differs substantially from the prior art, as it facilitates the production of electric energy by the excitation and capture of electrons from atoms, molecules and ions as contained on or beneath the surface of ground or water sources. The process can also be applied to the capture of electrons from other sources that include any other type or form of matter that can be passed along the surface or through the electron capture components, see reference numerals. The captured electrons are collected and controlled or regulated and are available for distribution to various electric devices or storage components. Subject to the implementation, the electric energy could be directed to an inverter where it would be converted to the desired form. It is an energy efficient process for the excitation and capture of electrons for the production of electricity and other purposes to which the process may be applied. These results are accomplished by the excitation, attraction and capture of electrons from the object particles by electrically charged particles, charged components and associated electric fields.

The process is superior to any other intended for the excitation, attraction and capture of electrons from ground or water sources. It also simplifies every application, implementation or utilization and speeds the operation for the production of a constant source of electrical energy. Those captured electrons from the atoms, molecules and ions of the ground or water sources are quickly replenished by other electrons that make their way to the surface of the planet.

Additionally, the process of the present application demonstrates its superiority to any other intended for the extraction of electrons from the atoms, molecules and ions of ground or water sources. Also, it is extremely efficient, in that once the system is fully charged thereafter it requires only an occasional replenishment of energy to sustain operation. These are important features for any utilization intended for the production of electric energy.

It is known that exposing the plates of a parallel plate capacitor to an electric potential difference will establish a charge upon them equal to the potential. This involves the removal of electrons from the neutral atoms of one plate with the placement of those electrons onto the opposite plate. Consequently, one plate becomes positively charged due to the shortage of electrons and the other plate becomes negatively charged due to the surplus electrons. Furthermore, when a parallel plate capacitor is charged as previously described and subsequently isolated, it can retain its effective electric charges for extended periods of many days, months or even years without substantial degradation. It follows that the positive and negative electric fields produced by such a capacitor will likewise persist for extended periods or until the capacitor is purposely discharged.

This is one of the principles by which the process of the present application functions. The process involves a charge segregation and storage assembly, by which the negative and positive charge of atoms and molecules can be separated, stored and if necessary, isolated. This entails the removal of electrons from one component with the placement of those electrons on another component. Although the principal component shown in the figures and discussed herein is a single charge segregation and storage assembly comprising components 18, 20 and 22, it should be noted that multilayered units may be used in various implementations. Furthermore, capacitors of various types are adaptable to the process. It is also understood that a system described by the present application will contain many charge segregation and storage assemblies or as many as may be required by an embodiment or utilization.

The embodiments contain conductive components, which include but are not limited to, an electron attraction component, an electron capture component and an electron isolation component. Shown in FIG. 1A is part 18 identified as the positive field plate which represents one of the components responsible for the attraction of electrons from an external source. Here also shown is part 26 identified as the electron extraction terminal to which a positive charge has been conveyed through direct contact to part 18. FIG. 1A likewise shows the third component, part 34 responsible for the isolation of the captured electrons. Part 34 also contributes to the attraction of those electrons coming from the external ground or water sources. An embodiment may contain any quantity of each of these components; although the actual number of each is determined by the requirements of the utilization.

The atoms, molecules, and ions whose electrons are to be captured will be referred to collectively as the object or target particles. Furthermore, the charged component dedicated to the capture of the electrons will occasionally be referred to as the electron excitation panel, but it is identified as the electron extraction terminal. The component may be constructed of various conductive materials and in various geometrical configurations, sizes, shapes, arrangements, and quantities.

The charged electron extraction terminal can be configured into many forms, but is also can take the form of a grid, pane, or panel. Throughout this application the term "grid" will be used to represent a variety of capture or extraction components as may comprise certain embodiments that include but are not limited to the use of screens, lattices, nets, webs, gridirons, gratings, trellises, grills, grids or similar components, or any combination thereof. And the term "pane" will be used to represent a variety of capture or extraction components as may comprise certain additional embodiments that include but are not limited to the use of sectioned or perforated panels, sheets, foil, disks, bars, rods, shafts, tubes, cones, plates, panes or similar components, or any combination thereof. And the term "panel" will be used to represent a variety of capture or extraction components as may comprise certain additional embodiments that include but are not limited to the use of an assembly of non-perforated, sheets, foil, disks, bars, rods, shafts, tubes, cones, plates, panes, or similar components or any combination thereof. Furthermore, an embodiment may contain any combination of grids, panes, panels or other varieties of components. The grid, pane, and panel type capture or extraction components are defined in greater detail below.

The primary difference between the electron extractor types relates to the method of their utilization and the required distance between the target atoms or molecules and the charged surfaces, coupled with the prescribed system of interaction between the target particles and the extraction components. The grid type consists of a conductive material containing mesh openings through which the target particles can pass. Whereas the pane type consists of a sheet or sheets of solid conductive material containing perforations of various configurations through which the particles can pass. And the panel type consists of an assembly of multiple individual non-perforated conductive sheets arranged with gaps in between where along the surface of which the particles can pass. The primary objective is to bring the target particles into close proximity to the charged surfaces of the various extractor types and if required, to enhance the probability of contact. Some extractor types as may be used within certain embodiments may be interchangeable and take a multitude of forms that are not specifically described herein, subject to the requirements of the implementation.

As previously stated, the extraction component as well as other components may take many forms and can be manufactured from different conductive materials or in some applications, from semiconductors, nanoparticles or ceramic compositions and various assemblages thereof. Certain metals and oxides thereof and various alloys and compounds thereof can also be used in some utilizations. The actual materials, geometrical configurations, sizes, shapes, arrangements, and quantities of all components of a system are determined by the specific utilization. Furthermore, the top and bottom of a grid or other extractor type may be shaped to conform to the shape of adjoining components or the surrounding container or environment into which the components are placed. Multiple extractors, if utilized, are operated individually as a group or as many groups as are necessary, by which the object atoms, molecules and ions are assembled. However, when single or multiple extraction components are part of an assembly containing a positive field plate or as applicable, include a negative field plate, they will be referred to collectively as the electron extraction assembly (EEA) of a type subject to the embodiment of the specific implementation.

A positive electric charge is placed upon one component of the electron attraction assembly, in reference to the positive field plate 18, where specifically the applied charge is sufficient to influence the valance electrons within a percentage of the atoms of the conductive material. For example, if 50 percent of the atoms are encouraged to give up one electron, the resultant positive charges will distribute evenly throughout the surface of the material. It is not that the positively charged protons distribute evenly, but that the remaining valance electrons will distribute across the surface of the material leaving positively charged holes evenly distributed. However, a +1 or greater net charge per atom can also be placed on the material, indicating the removal of one or more valence electrons from each atom of the positive field plate 18. The now positively charged atoms will extend the positive charge to adjoining components such as an electron extraction terminal that is in contact with ground or water sources. Thus, electrons will be captured from any atom, molecule or negative ion that closely approaches or comes into contact with the grid, pane or panel material of the EEA.

Other embodiments may utilize multiple grid type extraction assemblies in a water way or a pool specifically designed to hold pumped in sea water from which electrons will be excited, attracted, captured and then isolated.

Summarizing the previous discussion, because the number of valance electrons is known and varies with different materials, within certain limits the net average charge per atom of the positive field plate 18 can be controlled. Since the positive field plate connects with the electron extraction component, it becomes a positively charged terminal that extends substantial influence upon the target atoms and molecules or ions of the ground or water medium onto or into which it is placed. By exposing the atoms and molecules of the medium to a strong positive electric charge, their electrons are initially excited then at least one electron is captured from each particle in close proximity to the positive terminal. Obviously, atoms and molecules or ions thereof in a liquid medium can actually move towards the positive terminal with ease, whereas those in ground are less flexible. Nevertheless, whether in ground or water, a negative charge such as that property attributed to the electron will move towards the positively charged component.

Referring specifically to the grid or pane type terminal of the EEA intended for water application, additional control over the valance electrons of the medium is obtained by adjustment of the thickness of the material, type of material and the shape and opening dimensions of mesh or perforations in relation to the size of the object atom or molecule. Additional control is gained through adjustment of aperture sizes in height, width and depth and with shapes adjusted to maximize results for specific object atoms or molecules. Direct contact with the extraction material substantially increases the probability of capturing at least one electron from the object particle.

The quantity of electrons and the ease with which they can be removed from a target atom or molecule is usually subject to the particle's ionization potential. That is, the energy with which it is bound must be counteracted, where a higher ionization potential will require more energy to remove the electron. However, because the process of the present application takes advantage of the many unusual properties of liquid water, the removal of electrons is greatly enhanced. For example, inherently water molecules are continuously splitting into positive and negative ions, as follows: $H_2O = HOH \rightarrow H^+ + OH^-$ (hydroxide). The superscript plus and minus signs indicate the resultant charge upon the ions, where plus indicates the loss of an electron and minus indicates the gain of an electron. If more than one electron is added or removed then the signs would be followed by a number indicating the quantity of electrons. Furthermore, the $H^+$ ions often join with $H_2O$ molecules to form $H_3O^+$ ions (hydronium). The ions are also continuously reforming back into $H_2O$, demonstrating the constant transformation from neutral molecules into charged ions and back again. Accordingly water is self-ionizing. As can be seen, when the $H_2O$ molecule breaks apart, an electron is taken from the freed hydrogen atom forming the $H^+$ ion and transferred to the OH molecule to form the negatively charged $OH^-$ ion. Thus, every $OH^-$ ion carries an extra electron. Altogether, it carries eight from the oxygen atom and two electrons from the hydrogen, having a total of ten electrons. These common interactions indicate that the oceans and other water ways of the planet contain an endless supply of ions, half of which contain too many electrons. Additionally, when liquid water contains dissolved salts as do the planet's oceans they make up the electrolyte necessary for suitable electric conduction. Consequently, to capture these electrons, it is necessary to draw the negatively charged $OH^-$ ions to a positively charged terminal placed into contact with the water. In simple terms, the negative ions are attracted to the positive terminal, while the positive ions are repelled from it. These negative ions are stripped of their extra loosely held electrons that initially formed the ions, which are then captured and subsequently isolated by the process of the subject application.

Even though water is self-ionizing it is not a good conductor unless it contains an electrolyte consisting of certain dissolved chemicals, such as the salt present in seawater. One common salt present in seawater is composed of sodium and chlorine that when the elements combine in an ionic bond, they form a chemical compound of sodium chloride or NaCl. The ionic bond is the result of the atomic structure of Na and Cl, where Na has a slight positive charge and Cl a slight negative charge. The ingredients, $Na^+$ joins with the $Cl^-$ forming the electrolyte that enables electric conductivity and in turn adds two more species of potential ions to the medium. The process of the present application takes advantage of these natural properties of water, the dissolved electrolyte, and the ions contained therein.

Moreover, by the strict control of the variables described herein, including the average net positive charge per atom placed upon the positive field plate 18, often more than one electron can be captured from a target atom, molecule or negative ion. This has far reaching consequences, as subsequently described.

The required net positive charge is applied to the attraction component, the positive field plate, by the electric potential difference of the power source 16. Through the power source, during the initial system charging phase, electrons are removed from the positive field plate 18 and are transferred to the negative field plate 20. The electrons are prevented from escaping the negative field plate by a valve 14. And since the negative field plate is now fully charged and isolated from the positive field plate and the environment, the resultant electric fields will persist for an extended period of time, requiring only infrequent replenishment of energy. Once the required quantity of electrons has been transferred to the negative field plate the power source can be shut down.

The principle by which the various charged systems function is directly correlated to a series of electric fields specifically imposed upon the principal components. The first is the positive electric field placed upon field plate 18. The second is the negative electric field placed upon field plate 20. The third is the positive field placed upon the induction plate 30. The fourth is a negative field induced upon the front side of isolation plate 34. The fifth is the positive field induced upon the backside of isolation plate 34. The subject process relies upon the energy stored within the five electric fields described above. However, certain embodiments or utilizations may require additional principal components onto which electric fields must be imposed or induced. However the minor electric fields known to be produced by all electric parts and conductors in the presences of an electric current or changing magnetic field are not the subject of this paragraph.

Because the previously charged positive field plate 18 is connected to the electron extraction terminal 26, a positive charge is conveyed to it. When placing the positively charged terminal, on or below the surface of water containing an electrolyte, all nearby negative ions will be attracted to it. As the ions approach the terminal, those loosely held extra electrons are removed from the ions, which move up the conductor. Once the extracted electrons approach the positive field plate 18, they are prevented from returning to the medium by a valve 24. Also, the now captured electrons are simultaneously attracted by the electron isolation plate 34.

However, the process of the subject application does not apply just to ions, as it also applies to neutral particles. Although unionized atoms and molecules are electrically neutral internally, due to the concentration of electrons surrounding the nuclei of those particles, they exhibit a slight negative charge at their exterior. Consequently, unionized atoms and molecules of the medium, $H_2O$ molecules for example, are also attracted to the positive terminal 26 and will give up some of their electrons upon a close encounter or contact. The formerly neutral particles that have given up one or more electrons have become positive ions, which now repel from the positive terminal. These interactions cause a constant flow of fresh particles towards the terminal and a constant flow away from it.

Previously, during the initial system charging phase, as the electrons transferred from the atoms of positive field plate 18, to the negative field plate 20, strong electric fields were established upon each plate. When charging was complete, the power source shut off or went on standby. Through the electric fields, each plate maintains a constant influence on its counterpart, where the negative field plate 20 continues to repel many of the remaining valance electrons still held by the atoms of the positive field plate 18. These repelled valance electrons have no place to go except to the electron isolation plate 34. Through an induced positive electric charge placed upon the component, those remaining valance electrons are attracted and isolated and their return to the field plate 18 is prevented by the valve 32. The quantity of remaining valance electrons and those actually transferring from the positive field plate 18 to the isolation component is subject to the strength of the electric field initially placed upon the negative field plate 20 and the ionization potential of those remaining valance electrons.

The previously captured electrons from the water source were simultaneously attracted by the positive field plate 18 and the positive charge of the isolation plate 34. As the captured electrons begin filling the holes in the positive field plate 18, they are then repelled by the negative field plate 20 and attracted by the holes in the isolation plate 34. Since the captured, now repelled electrons cannot return to the water source, they must accumulate upon the isolation plate 34, where they become available as electricity.

Shown in FIG. 4A, the isolation plate 34 is connected through the terminals 38 to component 44 that is identified as a circuit load device. The load device 44 could be an electric storage device such as a battery, an inverter or some other device, subject to the implementation. It should be understood that in addition to batteries, there are many types of electric storage devices available. And in further reference to component 44, it represents any convenient or appropriate device that applies a load onto the circuit. In an alternate embodiment an inverter could follow the electric storage device in a circuit or vice versa.

The electron isolation assembly (EIA) consists primarily of three types of components that include the following: The positive induction plate 30, carries a positive electric charge. This charge was placed there during the initial system charging phase through the power source 16. That while electrons were being transferred from the positive field plate 18 to the negative field plate 20 they were simultaneously removed and transferred from the atoms of the positive induction plate 30. Just as with the charge placed upon the positive field plate 18, the charge placed upon the positive induction plate 30 is also controlled by the net average charge per atom. This means that the strength of all three electric fields that pertain to the electron isolation assembly can be controlled over a wide range. Once the charge is established on the positive induction plate 30, it influences certain interactions within the isolation plate 34. Due to the close proximity of one plate to the other, the positive induction plate attracts electrons to the surface of the isolation plate in equal numbers to those removed from it. Because the valance electrons of the atoms within the isolation plate have accumulated on the front surface section, this action induces a strong positive electric charge on the back section or backside of the plate, leaving positive holes for every missing electron. It is that induced positive charge on the back section of the isolation plate which contributes to the capture and draws captured electrons to it. They are attracted and subsequently isolated by the valve 32. In simpler terms, the positive charge placed on induction plate 30 attracts electrons to the surface of the facing isolation plate 34, which in turn induces a positive charge on the backside of plate 34. Those fields can best be described in this order: induction plate=positive, front side isolation plate=negative and backside isolation plate=positive. Since the positive induction plate 30 is charged and thereafter isolated, it maintains its charge for an indefinite period, requiring only infrequent replenishment.

The effect of the induced charge on one component by the electric field of another component, as described above, can be reproduced by other methods that include but are not limited to other types of components and energy applications that include AC current, fixed magnets, electromagnets, or other electromagnetic devices and principles or a combination thereof. In other embodiments, a strong magnetic field will have a similar effect with respect to placing a net charge on a material. Likewise, in another embodiment a combination of electric and magnetic fields can be applied for this purpose.

Therefore, once the principal components are properly charged, as during the initial system charging phase and with the negative field plate 20 and the positive induction plate 30 properly isolated, thereafter they will require only infrequent replenishment to maintain the effectiveness of the system operation. The electric energy that accumulates on the isolation plate or multiple plates is thus available as electricity, to be used as initially available, stored or changed to the required form and then utilized as needed.

As can be seen, the present process is innovative in the attraction, capture and isolation of electrons from ground or water sources for the production of electric energy, demonstrating its superiority to every prior art.

DRAWINGS

Figures

Described below are representations of several basic embodiments for which the designations are not indicative of any specific order or preference over any other embodiment. In the drawings, closely related figures have the same alphabetic suffix but different numbers.

Figure 1A:
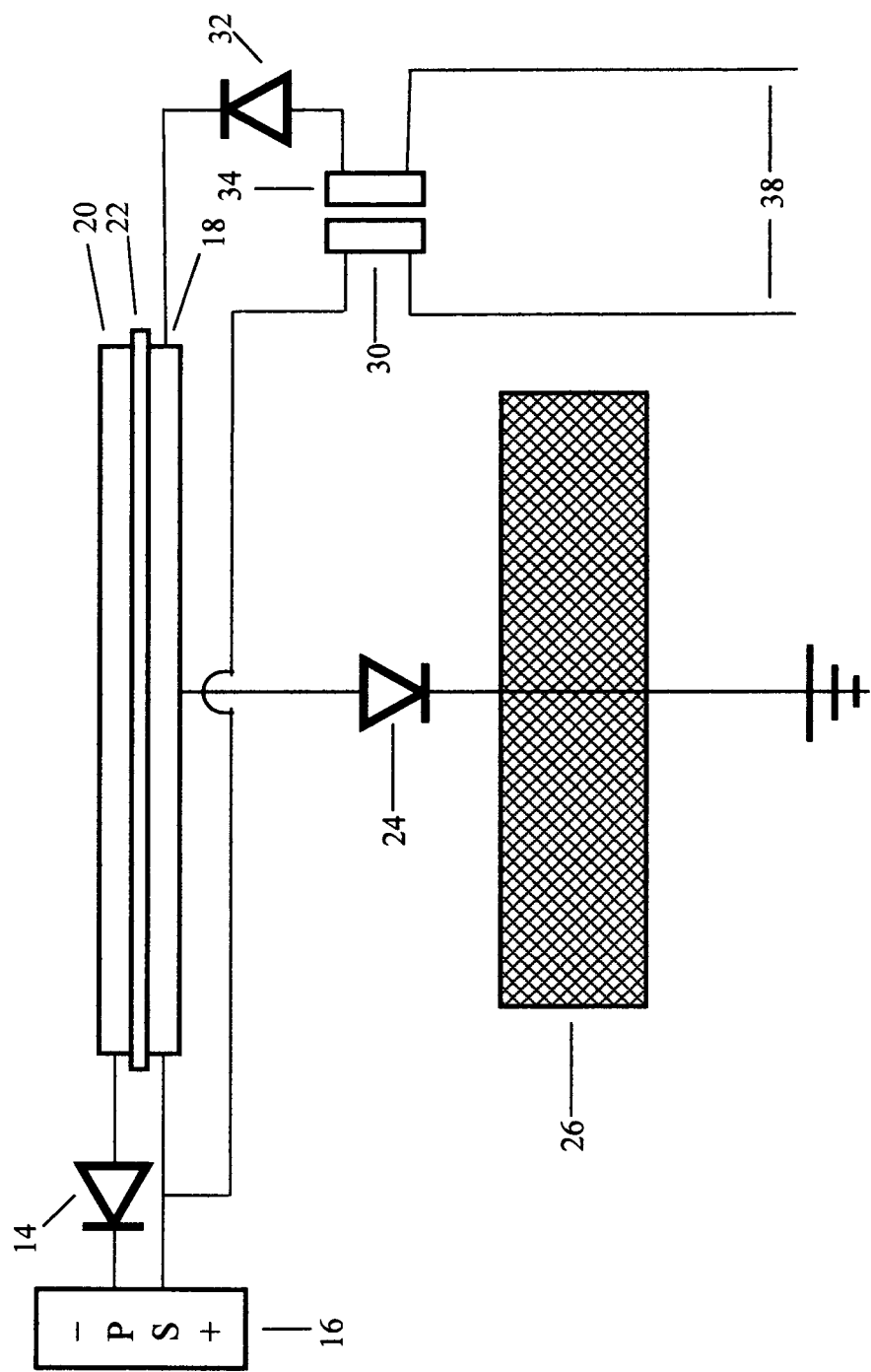
FIG. 1A shows one variation of an embodiment containing three valves and a single electron extraction terminal, where captured electrons are directed to the positive field plate and then to the electron isolation plate.

The figures described above are for purposes of explanation of the process and are not drawn to any relative or absolute scale. Furthermore, the actual size, shape, design and quantity of the parts are not absolute but rather are subject to the implementation.

DRAWINGS

Reference Numerals

12. Valve assembly, represented by a Diode
14. Valve assembly, represented by a Diode 16. Power source
18. Positive field plate
20. Negative field plate
22. Dielectric
24. Valve assembly, represented by a Diode
26. Electron extraction terminal
28. Valve assembly, represented by a Diode
30. Positive induction plate
32. Valve assembly, represented by a diode
34. Electron isolation plate
36. Valve assembly, represented by a Diode
38. Positive & negative terminals
40. Charge control unit
42. Switch
44. Circuit load device

DETAILED DESCRIPTION

FIGS. 1A, 2A, 3A and 4A—Variations of an Embodiment

DESCRIPTION

FIG. 1A

FIG. 1A shows one variation of the basic components of an embodiment coupled with a schematic diagram indicating their relative position within an electronic circuit. The components include a power source, part 16, with the negative terminal connected to the negative field plate, part 20, while the positive terminal is connected to the positive field plate, part 18. The parts 20 and 18 are in fact the negative and positive plates of a charge segregation and storage assembly, respectively.

As shown, the positive field plate 18 is connected to the power source 16 and through valve 14 to the negative field plate 20. The valve isolates the transferred electrons on the negative field plate 20 and prevents the return of electrons to the positive field plate and other components. All valves shown are represented by diodes although many types of valves can be used. The positive induction plate 30, also connects to the power source 16. Just as with the positive field plate 18, when the power source is activated, electrons are removed from the positive induction plate 30 and transferred to the negative field plate 20. The positive charge established there on plate 30 contributes to the capture and causes the attraction of captured electrons to the opposite electron isolation plate 34. Although a single isolation plate is shown, it is representative of a group consisting of any quantity that may be required by an implementation. The electric energy consolidated on the backside of the isolation plate 34 can now be distributed to many devices directly or put to use as may be necessary.

OPERATION

FIG. 1A

In a charging charge segregation and storage assembly connected to a power source, electrons will move from the positive field plate and accumulate upon the negative field plate. These electrons that are easily moved about are the valance or outer most electrons in the atoms of the field plate material. Likewise, here in FIG. 1A, the process involves an electric potential difference to be placed upon the conductive field plates, parts 18 and 20. The atoms of the positive field plate 18 experience a loss of electrons and consequently exhibit a strong positive electric field. Simultaneously those electrons accumulate upon the negative field plate 20 producing a strong negative electric field that maintains a constant influence upon the electrons remaining on the positive field plate 18. This influence extends not just to the remaining valance electrons present in the material, but also to the subsequent captured electrons. Nevertheless, these interactions create positive holes throughout the field plate 18 to which electrons from external sources are attracted. Therefore, positively charged atoms of the field plate 18 do more than just attract electrons from target particles, they also provide a temporary space for the captured electrons to occupy. During the initial system charging phase, as the valance electrons are being evacuated from the field plate 18, they are also being evacuated from the positive induction plate 30. The positive induction plate 30 attracts electrons of the atoms of the facing isolation plate 34 to its surface placing a negative charge there, thereby inducing a positive charge on the backside of the isolation plate 34.

Initially, the valance electrons of the field plate 18 move through the power source 16, through valve 14 and to the negative field plate 20. This continues until the field plate 20 is saturated, where then the power source 16 responds accordingly by shutting down or entering into a standby state whereby the remaining valance electrons and the subsequent captured electrons will move through valve 32 and accumulate on the backside of the electron isolation plate 34 or group thereof. Those remaining valance and the captured electrons are attracted to the isolation plate 34 by the strong positive charge induced upon the backside of the plate. At this point, the power source 16 remains off or in standby to replenish the charge on the negative field plate 20 when and if necessary. The circuit activates only if the charge on the field plate 20 should degrade, whereby the electric energy will be supplied from the subsequent captured electrons through the field plate 18 or supplied through other components such as the isolation plate 34 or as described in subsequent sections, subject to the implementation.

The quantity of repelled valance electrons is regulated by the strength of the electric field placed upon the field plates 18 and 20. Due, in part, to the expelled valance electrons nearest the negative field plate 20, subsequent electrons of the field plate 18 atoms are repelled, while simultaneously being attracted to the backside of isolation plate 34. These events leave a strong positive charge throughout the field plate 18. The valance electrons are prevented from returning to the field plate 18 by the valves 14 and 32. Once the field plates 18 and 20 are charged, energy consumption by the power source 16 reduces substantially to a negligible quantity or to '0'. Thereafter, energy will be applied infrequently and only if the charge on the negative field plate 20 should degrade. To prevent arcing and degradation of the negative electric field on plate 20, it is typically isolated from the ambient environment, subject to the specific utilization. The field plate 20 is also isolated from field plate 18 with either a sufficient gap or with a minimal and suitable nonconductive barrier, for example, or both. But nevertheless, to maximize the effect of the negative electric field thereof the two components, 18 and 20, are placed as close as possible to each other or as necessary.

Connected to the positive field plate 18 is the electron extraction terminal 26 to which a positive charge has been conveyed by the transfer of its valance electrons to field plate 18, then to isolation plate 34. The terminal 26 is placed into contact with ground or water sources. Thus, depending upon the embodiment or implementation, the target particles of the medium surround terminal 26. The target particles include atoms, molecules and negative ions. With every close encounter or direct contact with any part of the positively charged surfaces results in the capture of their valance electrons for atoms and molecules, or those extra electrons that formed the ions, the number being influenced by the net charge per atom of the terminal. Each atom of terminal 26 that has given up one or more electrons to field plate 18 will attract and capture electrons at every opportunity from every particle situated nearby or passing in close proximity.

Figure 4A:
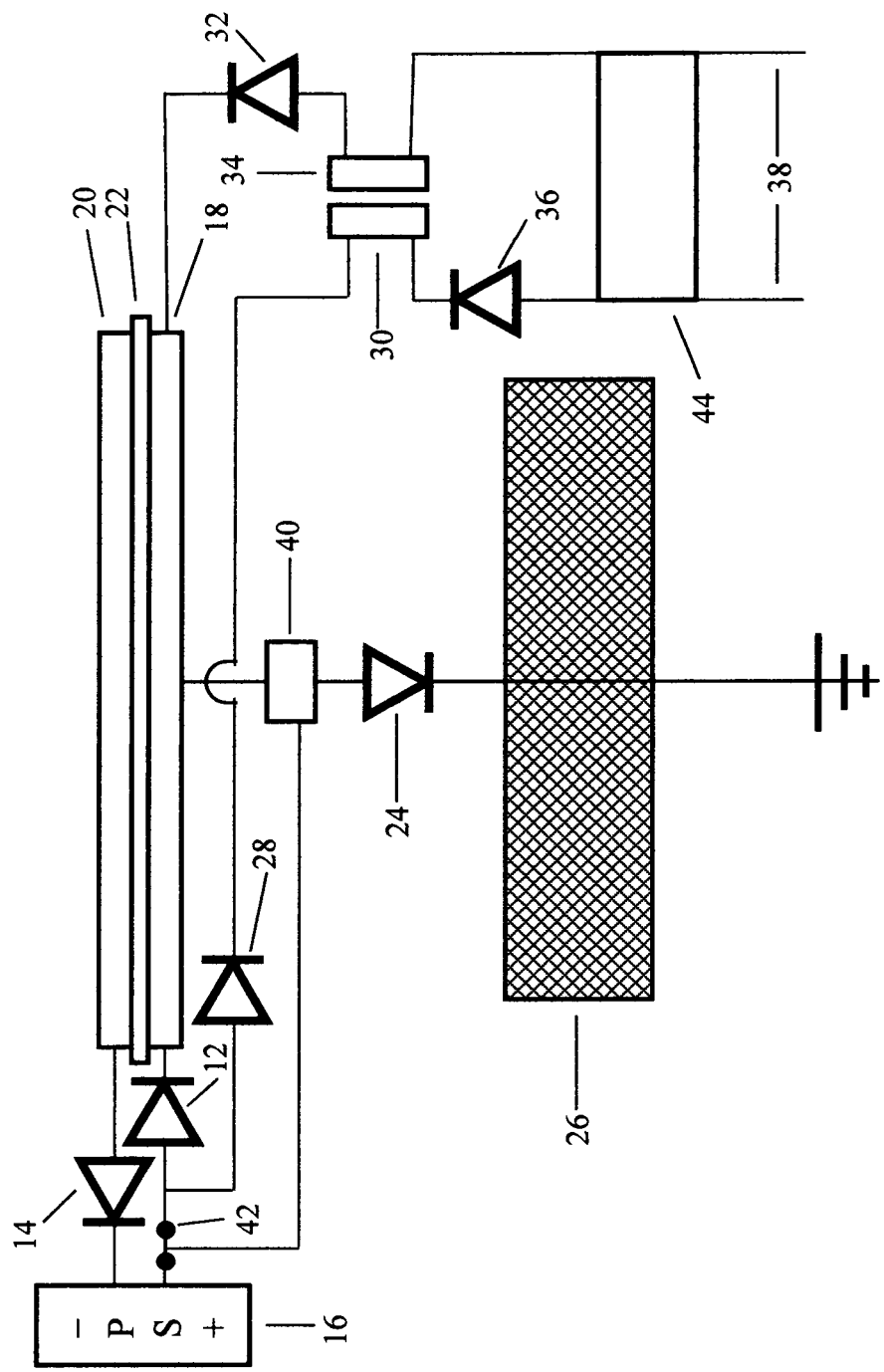
FIG. 4A shows another variation of the embodiment containing six valves, a switch, a charge control unit and a circuit load device.

If at any time the negative field plate 20, should suffer a loss of electrons and thereby experience a reduction in the negative electric field, it will be routinely replenished to the pre-existing or predetermined level or until fully saturated again with electrons extracted by the EEA. Supplemental electrons can be transferred to field plate 20 through a variety of circuits, one of which is shown in FIG. 4A. The negative field plate should remain isolated from the ambient environment unless a particular embodiment or implementation requires otherwise.

Now, if the electron extraction terminal system is placed on or in the ground and being sufficiently grounded, atoms, molecules and various negative ions present therein will give up electrons to the positive terminal 26. Moist or wet ground will enhance the effectiveness of the system.

If the electron extraction terminal system is placed on or in water sources and grounded as may be required, subject to the implementation, atoms, molecules and various negative ions present therein will give up electrons to the positive terminal 26. As previously described, through attraction a continuous flow of atoms, molecules, and negative ion will move towards terminal 26. After electrons are removed from these particles, those that become positive ions will repel from terminal 26.

The choice of material for the electron extraction terminal 26 is influenced by many factors, one being the primary objective of a chosen implementation and another relates to the type of electron capture component to be employed.

In the figure a single electron extraction terminal 26 is shown, however, it should be understood that it represents one or more terminal units or groups of units, or any number that may be required by a utilization.

In FIG. 1A a single electron isolation plate 34 is shown, however, it should be understood that it represents one or more plates or groups of plates, or any number that may be required by a utilization. Furthermore, the isolation plate could take many forms and could be made from different types of components, for the primary requirement is that the component should attract and isolate electrons of all sources. Any electric or electronic component or device or groups thereof that can satisfy the primary requirement is suitable for this purpose.

The previous statement also refers to the other components as well, for wherever one component is shown, it should be understood that it represents one or more component units, or groups of units, or any number that may be required by a utilization.

It should also be understood that subject to the requirements of a specific embodiment or implementation, common electronic components that may not be expressly shown in the figures are nevertheless represented as part of the block components.

As previously stated, the figures show the components and their relative position within an electronic circuit, however, the actual style, shape, size, value, configuration, design, specification and quantity of each part is determined by its final execution and relation to adjoining parts and components.

It should be noted that although in the various embodiments three, four, five or six valves are shown, they are representative of a group consisting of any quantity that may be required at any specific position or throughout the circuitry of an implementation.

As can be seen, by maintaining the respective electric charge upon the negative field plate 20, the positive field plate 18 and the positive induction plate 30 and placing a positively charged component of the embodiment in an environment containing ground or water sources, a continuous supply of electric energy is produced and made ready for use in a variety of systems through the power terminals 38.

In each of the following FIGS., 2A through 4A, the sequence of operation described above is similar, although additional components are added.

DESCRIPTION

FIG. 2A

Figure 2A:
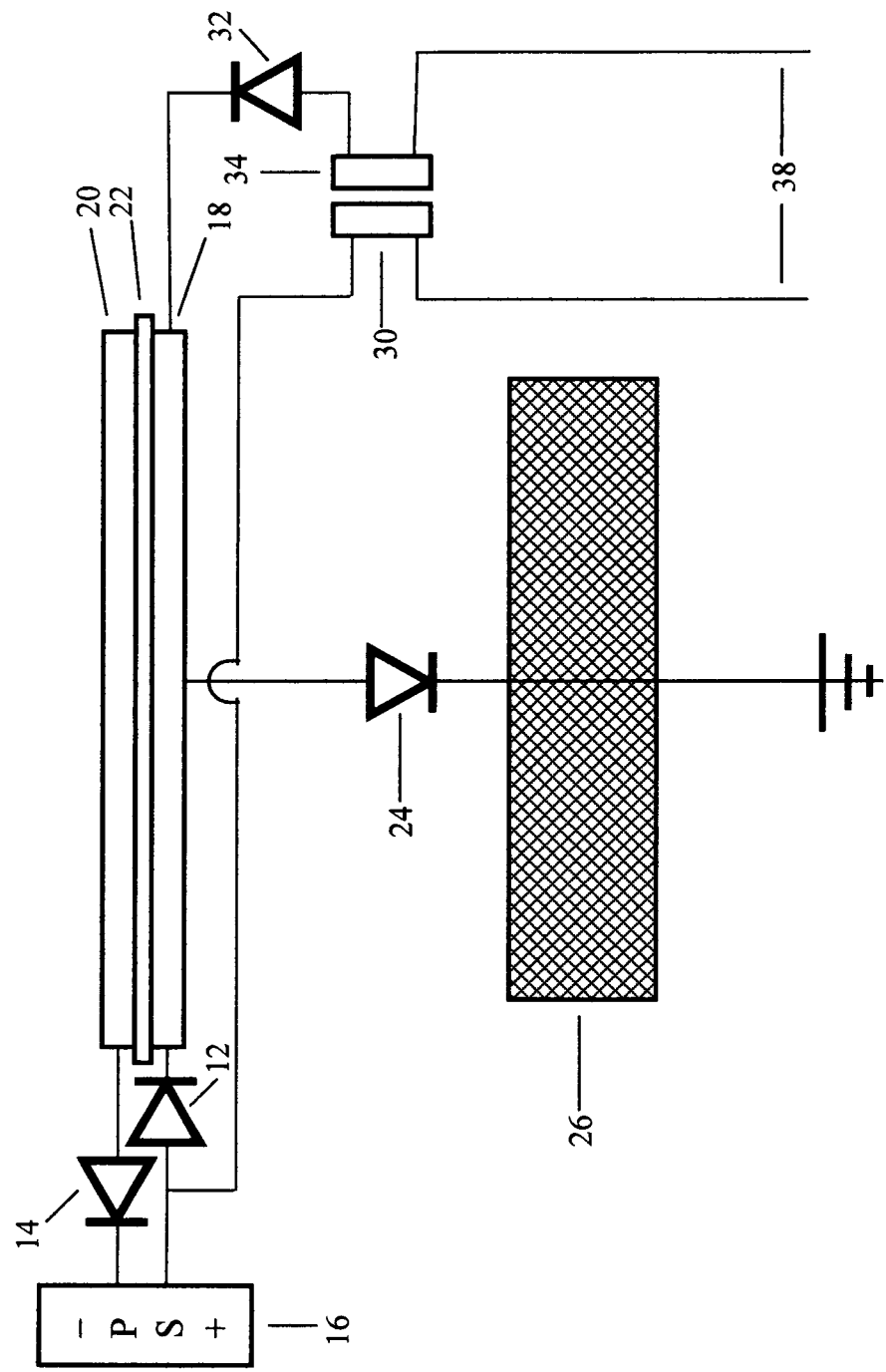
FIG. 2A shows another variation of the embodiment containing four valves.

FIG. 2A shows another variation of the basic components of an embodiment coupled with a schematic diagram indicating their relative position within an electronic circuit. The components include a power source 16, with the negative terminal connected to the negative field plate 20, while the positive terminal is connected to the positive field plate 18. The parts 20 and 18 are in fact the negative and positive plates of a charge segregation and storage assembly, respectively.

As shown, the positive field plate 18 is connected to the power source 16 through valve 12 and through valve 14 to the negative field plate 20. The valve 14 isolates the transferred electrons on the negative field plate 20 and valve 12 prevents the return of electrons to the positive field plate 18 through this terminal. All valves shown are represented by diodes although many types of valves can be used. The positive induction plate 30, also connects to the power source 16. Just as with the positive field plate 18, when the power source is initially activated, electrons are removed from the positive induction plate 30 and transferred to the negative field plate 20. The positive charge established there on plate 30 through induction contributes to the capture and causes the attraction of captured electrons to the opposite electron isolation plate 34. Although a single isolation plate is shown, it is representative of a group consisting of any quantity that may be required by an implementation. The electric energy consolidated on the backside of the isolation plate 34 can now be distributed through terminals 38 to many devices directly or put to use as may be necessary. This figure differs from the previous by the addition of valve 12, which prevents the return of internal source electrons to the field plate 18 through this terminal.

OPERATION

FIG. 2A

The basic operation of FIG. 2A is as that of the previous figure. From the perspective shown, electrons from the target atoms, molecules and negative ions of the ground or water sources are captured by the positive terminal 26. The close encounter or contact with the atoms of the terminal 26 material results in the capture of one or more electrons from each particle. As the electrons move up the conductor pass valve 24 they are prevented from returning to the ground or water medium. The captured electrons begin to assemble on the positive field plate 18; however, they are swiftly repelled by the strong negative electric field imposed by the field plate 20.

Simultaneously the positive charge induced on backside of the isolation plate 34 attracts the captured electrons, where they accumulate. Considering that the isolation plate represents any number that may be required, a substantial quantity of energy can amass over very short periods of time. The energy is thus immediately available for use in a variety of applications. As can be seen, by maintaining the respective electric charge upon the negative field plate 20, the positive field plate 18 and the positive induction plate 30 and placing the terminal 26 of the embodiment on or in a medium of ground or water, a continuous supply of electric energy is produced and made ready for use in a variety of systems. Additionally, the process functions as described above in FIG. 1A.

DESCRIPTION

FIG. 3A

Figure 3A:
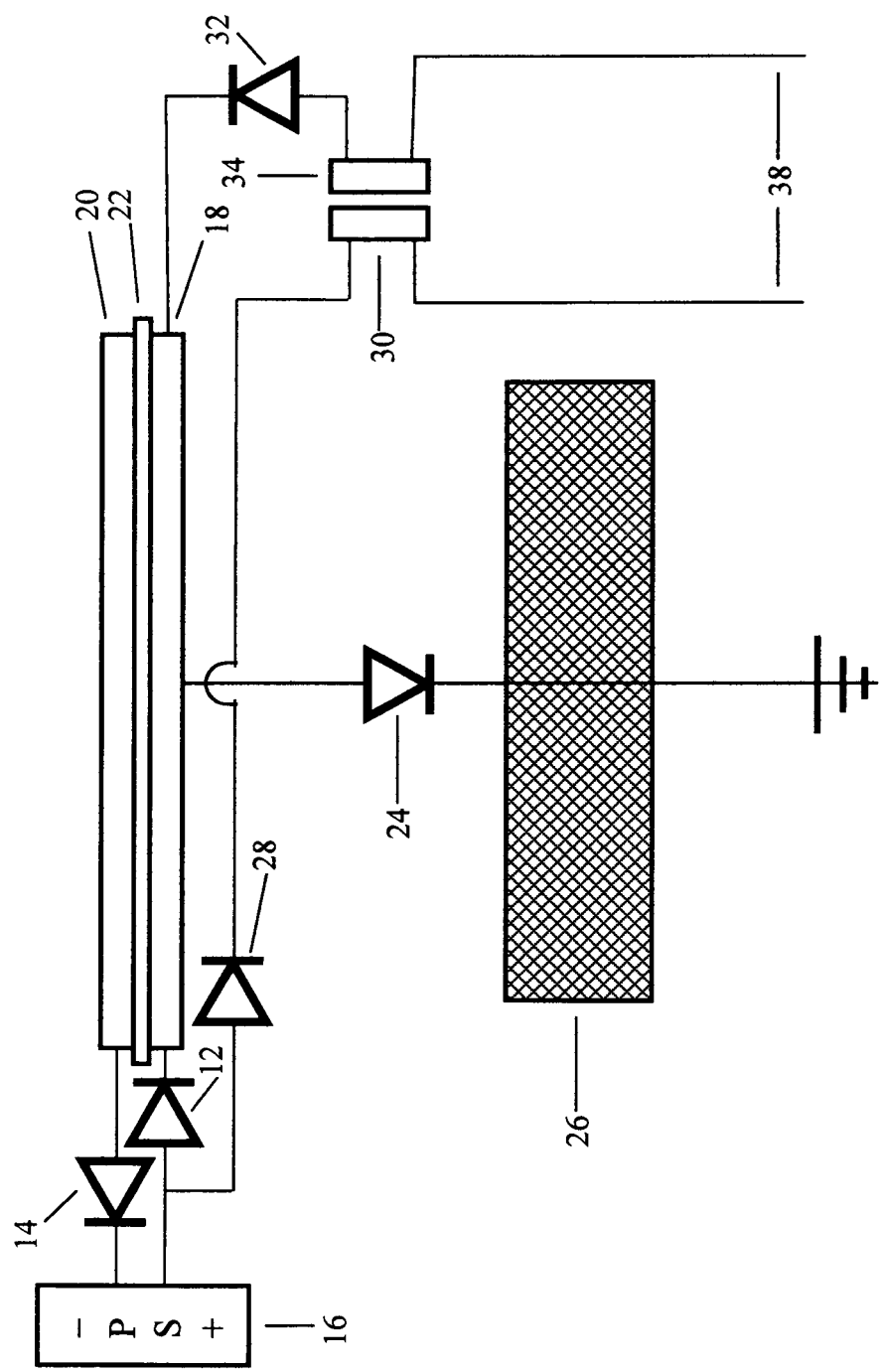
FIG. 3A shows another variation of the embodiment containing five valves.

FIG. 3A shows another variation of the basic components of an embodiment coupled with a schematic diagram indicating their relative position within an electronic circuit. The components include a power source 16, with the negative terminal connected to the negative field plate 20, while the positive terminal is connected to the positive field plate 18. The parts 20 and 18 are in fact the negative and positive plates of a charge segregation and storage assembly, respectively.

As shown, the positive field plate 18 is connected to the power source 16 through valve 12 and through valve 14 to the negative field plate 20. The valve 14 isolates the transferred electrons on the negative field plate 20 and valve 12 prevents the return of electrons to the positive field plate 18 through this terminal. All valves shown are represented by diodes although many types of valves can be used. The positive induction plate 30 also connects to the power source 16 through valve 28. Valve 28 prevents the return of electrons back to the induction plate 30 thereby isolating it. Just as with the positive field plate, when the power source is initially activated, electrons are removed from the positive induction plate 30 and transferred to the negative field plate 20. The positive charge established there through induction attracts electrons to the opposite electron isolation plate 34. Although a single isolation plate is shown, it is representative of a group consisting of any quantity that may be required by an implementation. The electric energy consolidated on the backside of the isolation plate 34 can now be distributed through terminals 38 to many devices directly or put to use as may be necessary. This figure differs from FIG. 2A by the addition of a fifth valve 28, which prevents the return of electrons to the induction plate 30. It should be observed that a single valve could take the place of valves 12 and 28.

OPERATION

FIG. 3A

The basic operation of FIG. 3A is as that of the previous figure. From the perspective shown, electrons from the target atoms, molecules and negative ions of the ground or water sources are captured by the positive terminal 26. The close encounter or contact with the atoms of the terminal 26 material results in the capture of one or more electrons from each particle. As the electrons move up the conductor pass valve 24 they are prevented from returning to the ground or water medium. The captured electrons begin to assemble on the positive field plate 18; however, they are swiftly repelled by the strong negative electric field imposed by the field plate 20. Simultaneously the positive charge induced on backside of the isolation plate 34 attracts the captured electrons, where they accumulate. Considering that the isolation plate represents any number that may be required, a substantial quantity of energy can amass over very short periods of time. The energy is thus immediately available for use in a variety of applications. A valve 28 is placed between the negative field plate 20 and the induction plate 30 to prevent the return of electron through this terminal. As can be seen, by maintaining the respective electric charge upon the negative field plate 20, the positive field plate 18 and the positive induction plate 30 and placing the terminal 26 of the embodiment on or in a medium of ground or water, a continuous supply of electric energy is produced and made ready for use in a variety of systems. Additionally, the process functions as described above in FIG. 1A.

DESCRIPTION

FIG. 4A

FIG. 4A shows another variation of the basic components of an embodiment coupled with a schematic diagram indicating their relative position within an electronic circuit. The components include a power source 16, with the negative terminal connected to the negative field plate 20, while the positive terminal is connected to the positive field plate 18. The parts 20 and 18 are in fact the negative and positive plates of a charge segregation and storage assembly, respectively.

As shown, the positive field plate 18 is connected to the power source 16 through valve 12 and through valve 14 to the negative field plate 20. The valve 14 isolates the transferred electrons on the negative field plate 20 and valve 12 prevents the return of electrons to the positive field plate 18 through this terminal. All valves shown are represented by diodes although many types of valves can be used. The positive induction plate 30 also connects to the power source 16 through valve 28. Valve 28 prevents the return of electrons back to the induction plate 30 through this terminal. Just as with the positive field plate, when the power source is initially activated, electrons are removed from the positive induction plate 30 and transferred to the negative field plate 20. The positive charge established there attracts electrons to the opposite electron isolation plate 34. Although a single isolation plate is shown, it is representative of a group consisting of any quantity that may be required by an implementation. The electric energy consolidated on the backside of the isolation plate 34 can now be distributed through terminals 38 to many devices directly or put to use as may be necessary. Here the electric energy is directed through the terminals to the circuit load device 44. Also a charge control unit 40 has been added to divert system produced electric energy when necessary to the negative field plate 20 through switch 42. Switch 42 is shown connected to the positive terminal of the power source 16, although, it can also be connected to the negative terminal that leads to plate 20. Valve 36 is connected between the induction plate 30 and the load device 44. This figure differs from FIG. 3A by the addition of valve 36, the charge control unit 40, the switch 42 and the circuit load device 44.

OPERATION

FIG. 4A

The basic operation of FIG. 4A is as that of the previous figure. From the perspective shown, electrons from the target atoms, molecules and negative ions of the ground or water sources are captured by the positive terminal 26. The close encounter or contact with the atoms of the terminal 26 material results in the capture of one or more electrons. As the electrons move up the conductor pass valve 24 they are prevented from returning to the ground or water medium. As the captured electrons assemble on the positive field plate 18, they are swiftly repelled by the strong negative electric field imposed by the field plate 20. Simultaneously the positive charge induced onto the backside of the isolation plate 34 attracts the captured electrons, where they accumulate. Considering that the isolation plate represents any number that may be required, a substantial quantity of energy can accumulate over very short periods of time. The energy is thus immediately available for use in a variety of applications. As can be seen, by maintaining the respective electric charge upon the negative field plate 20, the positive field plate 18 and the positive induction plate 30 and placing the terminal 26 of the embodiment on or in a medium of ground or water, a continuous supply of electric energy is produced and made ready for use in a variety of systems. Furthermore, it has been demonstrated that any degradation of the electric charge on these components can be replenished when necessary through the energy produced by the system by a circuit as that shown or one similar that is placed elsewhere in the system. Additionally, the process functions as described above in FIG. 1A.

ALTERNATIVE EMBODIMENTS

Although the descriptions above show many alternative embodiments, they should not be interpreted as to limit the scope of the embodiments, as they are representations of only a small number of potential embodiments. Furthermore, the principal components of any embodiment may be arranged differently and the components may take on different values, shapes, configurations, specifications and quantities from that shown or described herein.

Advantages:

Some of the terms that describe the advantages of the process of the present application are simplicity, efficiency, adaptability, versatility, low energy consumption, and high productivity. It is an innovative process for the production of electric energy from ground or water sources. It can operate continuously 24 hours per day without interruption provided the proper electric charge is maintained upon each of the three principal components that include the negative field plate, the positive field plate and the positive induction plate of the electron isolation assembly. Through the process, electric energy can be supplied individually to each structure, community or demand location making them independent from any other energy source. It can be scaled to accommodate the electric power requirements of many implementations and utilizations that extend from the national power grid to portable units and units fitted to stationary or portable appliances, devices, apparatus and vehicles.

CONCLUSION, RAMIFICATIONS AND SCOPE

Accordingly, the reader will see that the process of the present application is superior to all prior art for the excitation and capture of electrons from atoms, molecules and negative ions from ground or water sources for the production of electricity.

The invention claimed is:

1. A process for the excitation, extraction, capture and isolation of electrons of particles from medium sources, comprising:
   a. providing a means for the capture of electrons of particles from a medium of ground or other sources,
   b. providing a means for the capture of electrons of particles from a medium of water or other sources,
   c. providing a means for the capture and isolation of electrons through the attraction of said electrons to positive electric charges induced onto a section of electron isolation components,
   d. providing a means to produce positive electric charges by an induced negative electric charge placed onto another section of said electron isolation components,
   e. providing a means to induce positive and negative electric charges onto sections of said electron isolation components by exposing said components to positive electric fields,
   f. providing a means to excite, extract and capture electrons of said mediums by the attraction of said electrons to positively charged holes,
   g. providing a means to produce positively charged holes by exposing components to positive and negative electric fields,
   h. providing a means to produce said positive and negative electric fields through the application of charge segregation and storage assemblies,
   i. providing a means of charge segregation and storage by the application of an electric potential difference,
   j. providing a means for the production of said electric fields through any combination selected from the group consisting of electric, magnetic or electromagnetic sources,
   k. enabling the control or distribution of said captured or isolated electrons as electric energy.

* * * * *